United States Patent
Chen

(10) Patent No.: US 10,762,503 B2
(45) Date of Patent: Sep. 1, 2020

(54) METHOD, DEVICE AND SYSTEM FOR ONLINE PAYMENT

(71) Applicant: Tencent Technology (Shenzhen) Company Limited, Shenzhen (CN)

(72) Inventor: Yang Chen, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/222,963

(22) Filed: Dec. 17, 2018

(65) Prior Publication Data
US 2019/0122213 A1    Apr. 25, 2019

Related U.S. Application Data

(63) Continuation of application No. 14/569,398, filed on Dec. 12, 2014, now Pat. No. 10,192,218, which is a
(Continued)

(30) Foreign Application Priority Data

Oct. 25, 2013 (CN) .......................... 2013 1 0513239

(51) Int. Cl.
*G06Q 30/00* (2012.01)
*G06Q 20/40* (2012.01)
(Continued)

(52) U.S. Cl.
CPC ............ *G06Q 20/40* (2013.01); *G06Q 20/12* (2013.01); *G06Q 30/0641* (2013.01); *H04L 2209/56* (2013.01); *H04L 2463/102* (2013.01)

(58) Field of Classification Search
None
See application file for complete search history.

(56) References Cited

U.S. PATENT DOCUMENTS

2006/0294007 A1    12/2006   Barthelemy
2010/0082485 A1*   4/2010    Lin ........................ G06Q 20/12
                                                              705/44
(Continued)

FOREIGN PATENT DOCUMENTS

CN    101553838 A    10/2009
CN    101957958 A    1/2011
(Continued)

OTHER PUBLICATIONS

Aloul, Fadi, Two Factor Authentication Using Mobile Phones, Jun. 5, 2009, 2009 IEEE/ACS International Conference on Computer Systems and Applications, pp. 641-644 (Year: 2009).*
(Continued)

*Primary Examiner* — Michael Misiaszek
*Assistant Examiner* — Timothy J Kang
(74) *Attorney, Agent, or Firm* — Morgan, Lewis & Bockius LLP

(57) ABSTRACT

Methods and devices for online payments are disclosed. Prior to accepting payment account information from a user for the payment transaction, a client terminal sends an interface listing command to a transaction server, requesting the transaction server to identify one or more acceptable input interfaces for receiving the payment account information. The transaction server responds to the interface listing command by a payment input instruction. The client terminal uses the payment input instructions to generate a payment information interface to present the one or more acceptable input interfaces for user selection. The user can choose how to input the payment information that best conforms to the user's expectations for security and convenience. The current method, device and system provide additional flexibility, improve efficiency, and facilitate online payment.

14 Claims, 13 Drawing Sheets

Related U.S. Application Data continuation of application No. PCT/CN2014/081021, filed on Jun. 27, 2014.

(51) Int. Cl.
  G06Q 20/12 (2012.01)
  G06Q 30/06 (2012.01)

(56) References Cited

U.S. PATENT DOCUMENTS

| | | | |
|---|---|---|---|
| 2010/0205541 A1* | 8/2010 | Rapaport | G06Q 10/10 715/753 |
| 2011/0137742 A1* | 6/2011 | Parikh | G06Q 20/04 705/26.1 |
| 2012/0123841 A1 | 5/2012 | Taveau et al. | |
| 2014/0263618 A1* | 9/2014 | McCarthy | G06Q 40/02 235/379 |

FOREIGN PATENT DOCUMENTS

| | | |
|---|---|---|
| CN | 102511051 A | 6/2012 |
| CN | 102821157 A | 12/2012 |
| CN | 103136663 A | 6/2013 |
| CN | 103258269 A | 8/2013 |
| CN | 103295339 A | 9/2013 |

OTHER PUBLICATIONS

Tencent Technology, ISRWO, PCT/CN2014/081021, Oct. 14, 2014, 6 pgs.

Tencent Technology, IPRP, PCT/CN2014/081021, Apr. 26, 2016, 4 pgs.

Aloul, Two Factor Authentications Using Mobile Phones, Jun. 5, 2009, IEEE/ACS International Conference on Computer Systems and Applications, pp. 641-644 (2009).

* cited by examiner

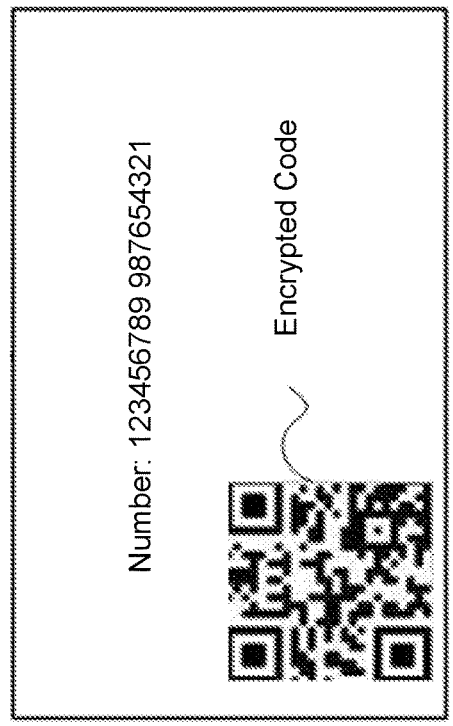
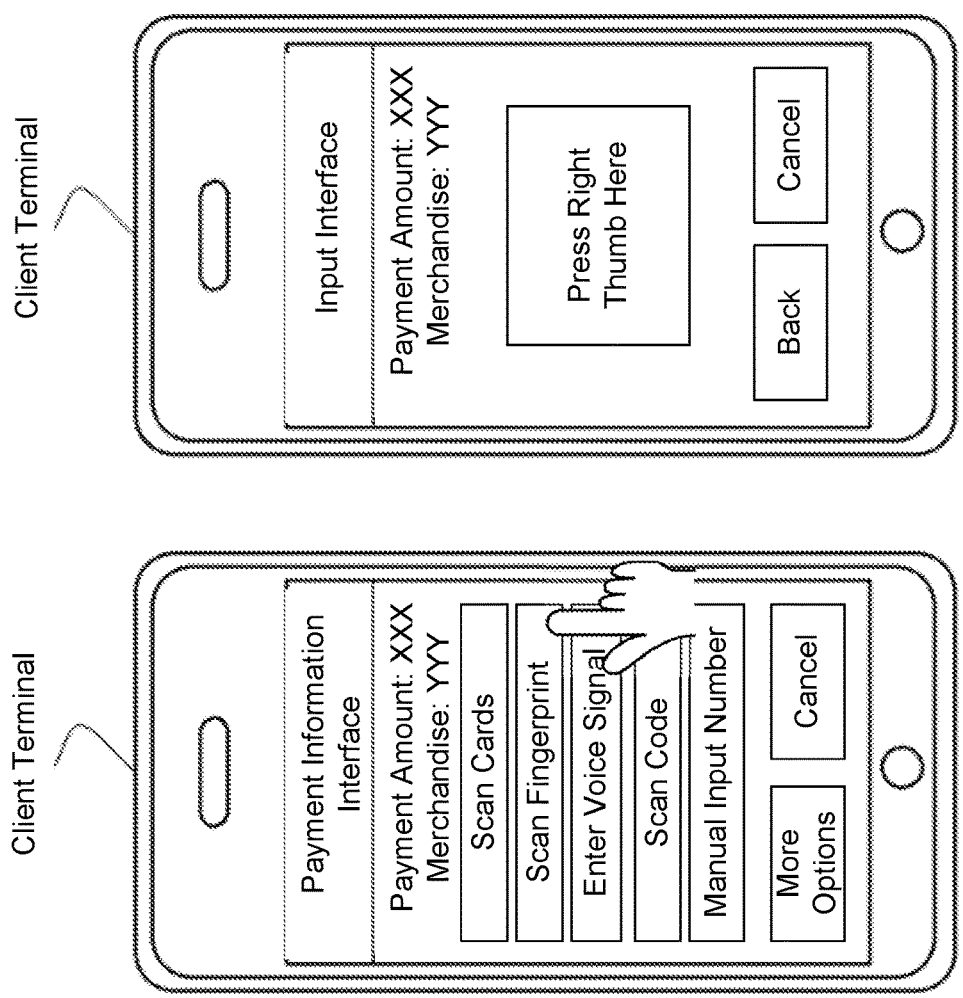
FIG. 3C
FIG. 3B
FIG. 3A

METHOD, DEVICE AND SYSTEM FOR ONLINE PAYMENT

PRIORITY CLAIM AND RELATED APPLICATION

This application is a continuation application of U.S. patent application Ser. No. 14/569,398, entitled "METHOD, DEVICE AND SYSTEM FOR ONLINE PAYMENT", filed Dec. 12, 2014, which is a continuation application of PCT Patent Application No. PCT/CN2014/081021, entitled "METHOD, DEVICE AND SYSTEM FOR ONLINE PAYMENT" filed on Jun. 27, 2014, which claims priority to Chinese Patent Application No. 201310513239.4, "METHOD, DEVICE AND SYSTEM FOR ONLINE PAYMENT," filed on Oct. 25, 2013, all of which are hereby incorporated by reference in their entirety.

FIELD OF THE TECHNOLOGY

The present disclosure relates to the field of Internet technologies, and in particular, to methods, devices and systems related to online payment.

BACKGROUND OF THE TECHNOLOGY

With the development of network technologies, it has become more and more popular to conduct online shopping and payment with terminals as smart phones (e.g. Android® phones and iOS® phones), tablet computers, handheld computers as well as Mobile Internet Devices (MID), and PAD. For online payments, a user, while utilizing the terminal to perform online shopping, can usually choose to pay with a payment card, such as a credit card or debit card, and further input card information (such as card number and/or expiration date) through the user terminal manually so as to finish online payment. However, such an approach in actual practice may be both cumbersome and error-prone. Manually inputting the information for online payment makes the payment operation more complex and reduces the online payment efficiency.

SUMMARY

The above deficiencies and other problems associated with the existing technology may be reduced or eliminated by the techniques disclosed below. In some embodiments, the technology is implemented in a computer system that has one or more processors, memory and one or more modules, programs or sets of instructions stored in the memory for performing multiple functions. Instructions for performing these functions may be included in a non-transitory computer program product configured for execution by one or more processors.

One aspect of the technology involves a computer-implemented method performed by a client terminal. Prior to accepting payment account information from a user for the payment transaction, the client terminal may send an interface listing command to a transaction server, wherein the interface listing command requests the transaction server to identify one or more acceptable input interfaces for receiving the payment account information from the user. In response to sending the interface listing command, the client terminal may receive a payment input instruction from the transaction server, wherein the payment input instruction includes a listing of the one or more acceptable input interfaces for receiving the payment account information from the user. Based on the payment input instruction, the client terminal may generate a payment information interface for display at the client terminal, wherein the payment information interface presents the one or more acceptable input interfaces for user selection.

Another aspect of the technology involves a client terminal. The client terminal includes memory, one or more processors, and one or more program modules stored in the memory and configured for execution by the one or more processors. The one or more program modules include: a transfer module configured to send an interface listing command to a transaction server prior to accepting payment account information from a user for a payment transaction, wherein the interface listing command requests the transaction server to identify one or more acceptable input interfaces for receiving the payment account information from the user; a server instruction receiving module configured to receive a payment input instruction from the transaction server in response to sending the interface listing command, wherein the payment input instruction includes a listing of the one or more acceptable input interfaces for receiving the payment account information from the user; and a generating module configured to generate a payment information interface for display at the client terminal based on the payment input instruction, wherein the payment information interface presents the one or more acceptable input interfaces for user selection.

Another aspect of the technology involves a non-transitory computer readable storage medium having stored therein instructions, which when executed by a computer system, e.g. a client terminal, cause the computer system to: prior to accepting payment account information from a user for the payment transaction, send an interface listing command to a transaction server, wherein the interface listing command requests the transaction server to identify one or more acceptable input interfaces for receiving the payment account information from the user; in response to sending the interface listing command, receive a payment input instruction from the transaction server, wherein the payment input instruction includes a listing of the one or more acceptable input interfaces for receiving the payment account information from the user; and based on the payment input instruction, generate a payment information interface for display at the client terminal, wherein the payment information interface presents the one or more acceptable input interfaces for user selection.

Some embodiments may be implemented on either the terminal side or the server side of a terminal-server network environment.

BRIEF DESCRIPTION OF THE DRAWINGS

The aforementioned features and advantages of the technology as well as additional features and advantages will be more clearly understood hereinafter as a result of a detailed description of preferred embodiments when taken in conjunction with the drawings.

FIGS. 3A and 3B are exemplary screen shots of the client terminal according to some embodiments;

FIG. 3C is a schematic illustration of a payment card displaying an encoded identification code according to some embodiments;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The embodiments of the present disclosure disclose an online payment method, related device and system, capable of simplifying payment operations and improving online payment efficiency.

Figure 1:
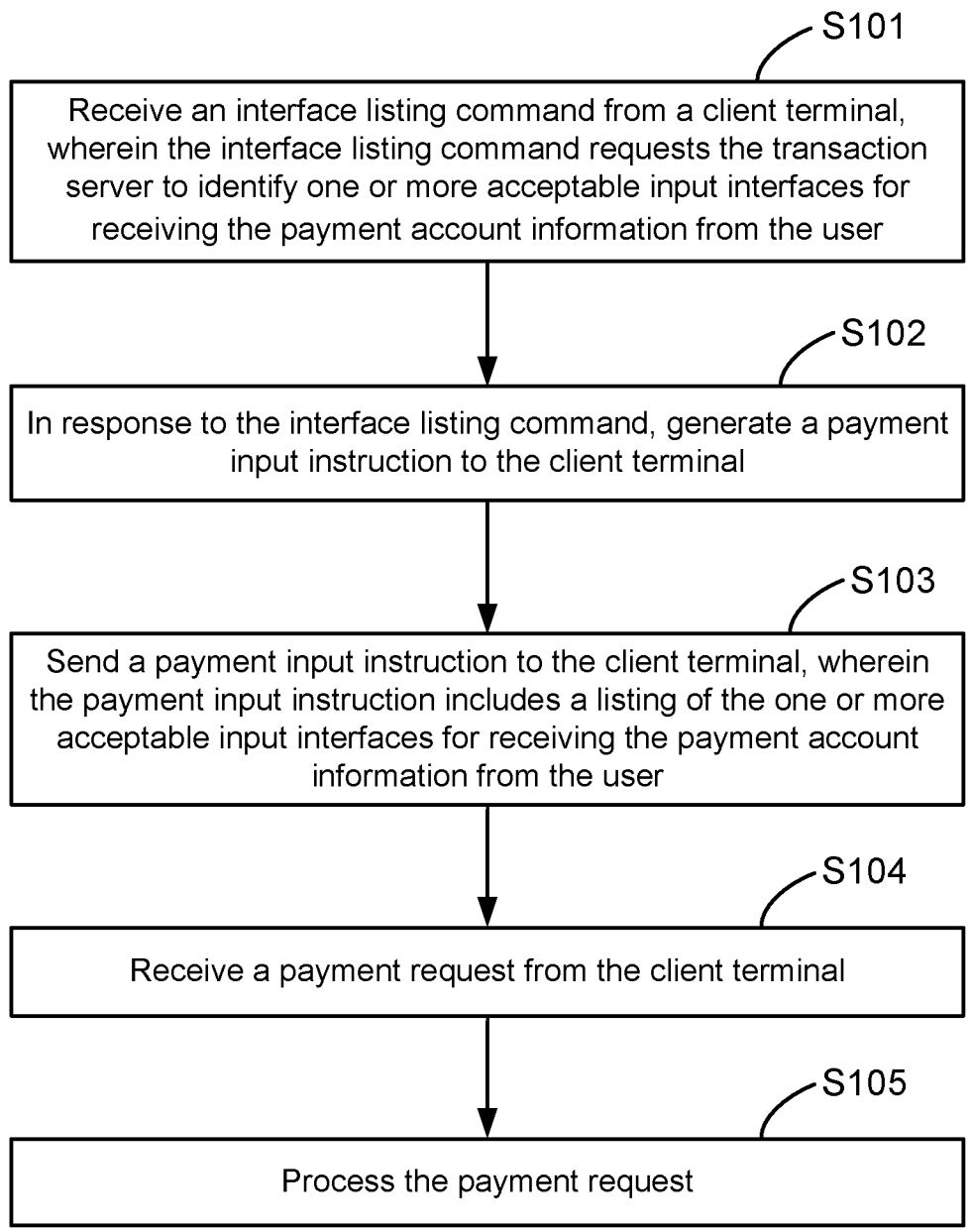
FIG. 1 is a flowchart illustrative of an online payment method conducted by a transaction server according to some embodiments.
Figure 4:
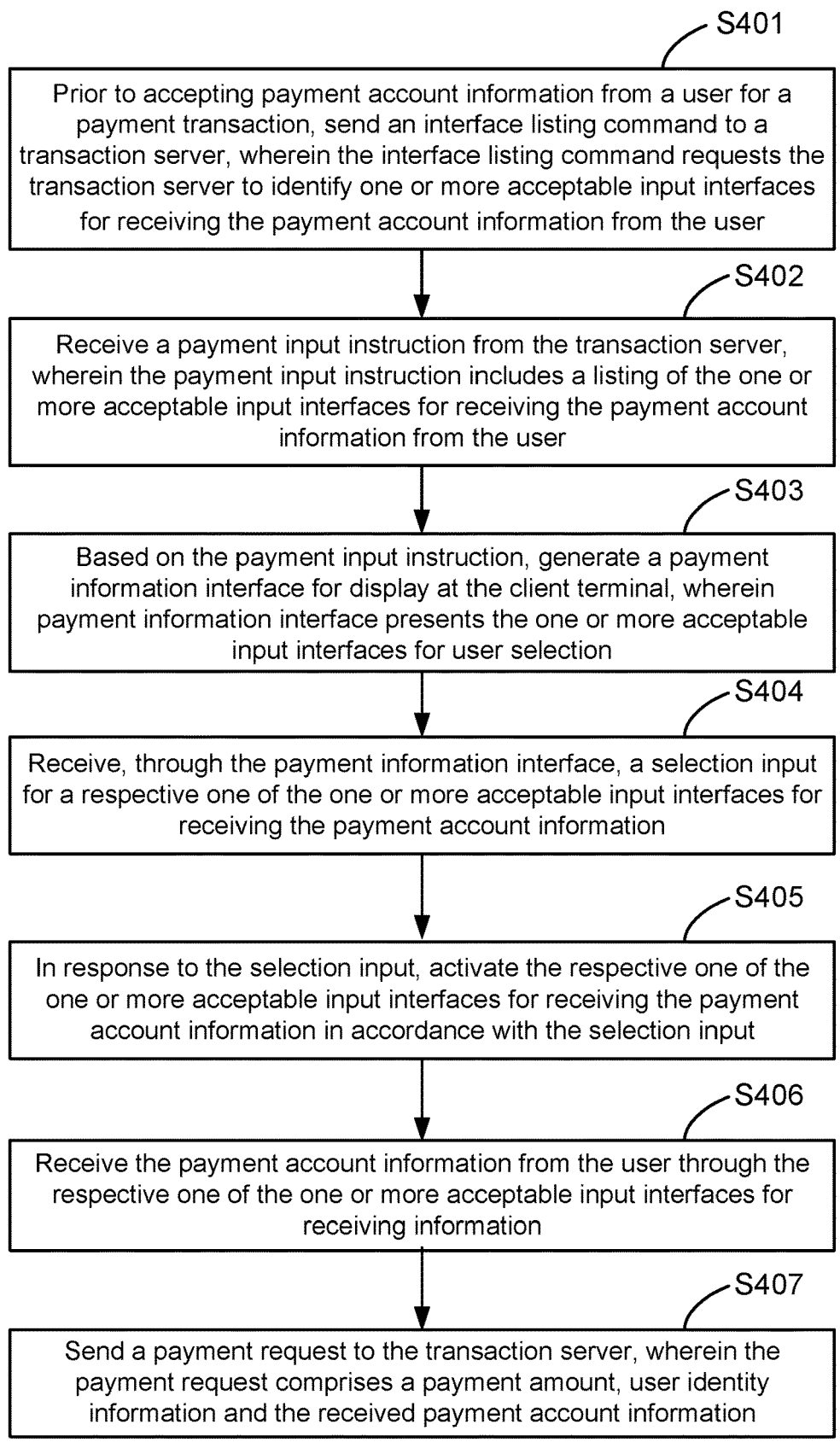
FIG. 4 is a flowchart illustrative of an online payment method conducted by a client terminal according to some embodiments.
Figure 5:
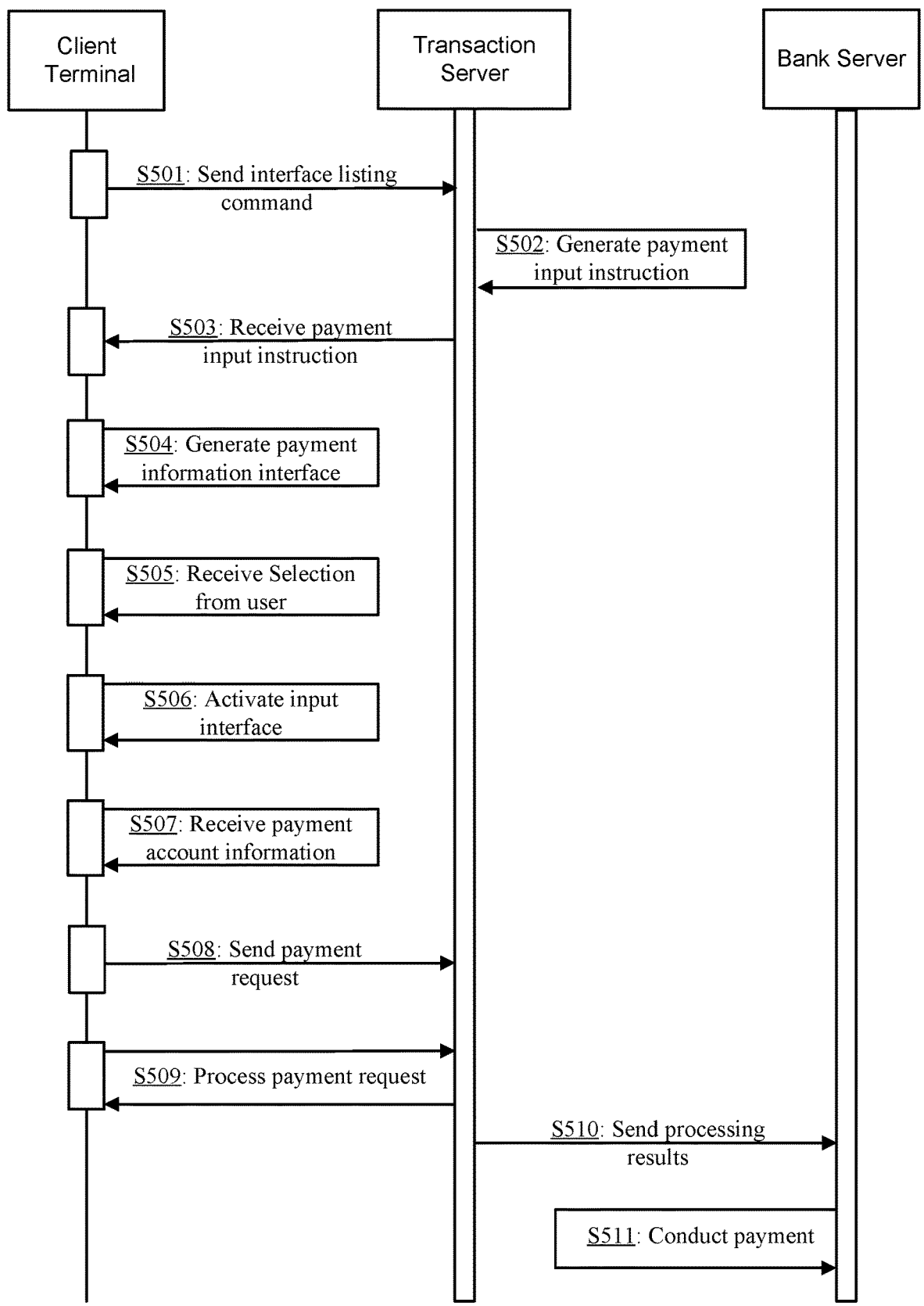
FIG. 5 is schematic illustration of an online payment method, showing how a client terminal, a transaction server, and a bank server interact according to some embodiments.

FIG. 1 is a flowchart illustrative of an online payment method conducted by a transaction server according to some embodiments of the present disclosure. FIG. 4 is a flowchart illustrative of an online payment method conducted by a client terminal according to some embodiments of the technology. FIG. 5 is schematic illustration of an online payment method, showing how a client terminal, a transaction server, and a bank server interact according to some embodiments of the present disclosure. For FIGS. 5, 6 and 8, when an action involves both the client terminal and the transaction server, the description is provided from the perspective of the client terminal. The corresponding operations of the transaction server would be apparent in light of the present disclosure to a person skilled in the art without further creative efforts.

As shown by step S101 of FIG. 1, and also referring to step S401 of FIG. 4 and S501 of FIG. 5, prior to accepting payment account information from a user for a payment transaction, the client terminal sends an interface listing command to a transaction server. In some embodiments, the interface listing command requests the transaction server to identify one or more acceptable input interfaces for receiving the payment account information from the user.

The devices used for the payment method of the present disclosure can be any device having computational and communication capabilities. For example, the client terminal may be tablet PCs, mobile phones, electronic readers, remote controls, personal computers (PC), notebook computers, vehicle computer units, network television, wearable devices or POS terminal and other smart devices. The transaction server according to some embodiments of the present disclosure may be any computing device that have computing and network capabilities. For example, the transaction server can be a server for a communication program such as a social networking application installed on the client terminal.

To conduct a payment transaction, the user needs to input payment account information such as but not limited to payment account number, expiration date, user name and date of birth (DOB), user address, issuer (e.g. bank) name, and issuer address. With the payment account information, the transaction server can identify the payment account and conduct further verification and processing so that the payment transaction can be completed. The methods herein disclosed provide more flexibility and control for the process of inputting payment account information. It should also be noted that in some embodiments the user can enter information that can be used to identify the payment account information. For example, the user can enter identity information such as the user's fingerprint and the client terminal or transaction server can identify the payment account information based on the identity information that is entered. The descriptions herein provided are directed to the input of payment account information, which can be viewed as an example of the input of other information that can be used to identify the payment account information. For example, the phrase "prior to accepting payment account information" can be understood as prior to accepting information that can be used to obtain the payment account information.

As indicated, the payment account information and other information that can be used to obtain the payment account information can vary. However, not every client terminal or every transaction server accepts all the types of information that can be used. The devices are limited by the hardware profile and the software programs available. For example, if the client terminal is not equipped with a scanning accessory or camera, the client terminal may not be able to scan information carriers such as credit cards or biometric information such as fingerprint. In addition, different types of information may present different types of challenges to transaction security and efficiency and different transactions may have specific requirements. Therefore, in some embodiments it is important to decide which types of information are to be requested from the user and which types input choices can be available to the user.

In some embodiments, the client terminal automatically selects from a list of input interfaces based on its hardware and software capabilities and sends the selected input interfaces to the transaction server for further selection. Such an approach ensures that the selected input interfaces can be properly operated by the client terminal. Alternatively, the input interfaces presented by the client terminal to the transaction server may also be not limited by the hardware and software of the client terminal. In some embodiments, there is a default list of input interfaces; the client terminal sends the list to the transaction server without selection beforehand. In some embodiments, the client terminal lists the presentable input interfaces from the selection of the transaction server in a payment information interface. In some embodiments, the client terminal presents all the input interfaces selected by the transaction server to the user with the payment information interface and informs the user that some choices cannot be operated before or after the user makes his/her selection. In some embodiments, the transaction server stores a profile of hardware, software, and preferences of the client terminal and chooses from a list of input interfaces sent by the client terminal not only based on the profile of the transaction server, but also the profile of the client terminal.

For a client terminal, different types of input interfaces may be acceptable. The examples of such interfaces include but are not limited to: a text input interface, an image capturing interface, a code scanner interface, a speech input interface, a fingerprint input interface, an electronic card reader interface, a magnetic card reader interface, and an electronic storage retrieval interface. The input interfaces can be used to allow the user to input different kinds of information. The input interfaces can be listed by a payment information interface so that the user can make selections in the payment information interface and input the payment account information or the information that can be used to obtain the payment account information through selected the input interface. The input interfaces may be part of or associated with communication software that is installed on the client terminal. Alternatively, the communication software, e.g. a social networking or messaging application, can incorporate or employ the input interfaces that are associated with another application or with the operating system of the client terminal.

The interface listing command may include a number of information items such as but not limited to: an identifier of the client terminal, a request to the transaction server for the identification of input interfaces, and a list of the input interfaces available at the client terminal. The identifier of the client terminal may be used by the transaction server to identify the client terminal. In some embodiments, the transaction server may have pre-approved list of client terminals that can induce a response from the transaction server. The interface listing command may also notify the transaction server that there is a pending payment transaction that requires payment account information input. In some embodiments, the interface listing command may provide information related to the payment transaction such as the payment amount and the identifier of the target account—the account that will accept funds from the payment account or transfer funds to the payment account.

As shown by steps S102 and S103 of FIG. 1, also referring to step S402 of FIG. 4 and steps S502 and S503 of FIG. 5, the transaction server generates a payment input instruction to the client terminal in response to the interface listing command; the transaction server sends the payment input instruction to the client terminal; and the client terminal receives the payment input instruction from the transaction server. In some embodiments, the payment input instruction includes a listing of the one or more acceptable input interfaces for receiving the payment account information from the user.

The payment input instruction specifies what input options can be accepted by the transaction server. The payment input instruction may include a list of acceptable input interfaces that the transaction server selects. In some embodiments, the transaction server may make the decision based on the hardware profile of the transaction server. In some embodiments, the transaction server may make the decision based on the software profile on the transaction server. In some embodiments, the transaction server may make the decision based on the specific transaction that is involved. For example, when the payment amount is high, e.g. above a preset threshold, the transaction requires more security and the transaction server selects interfaces that require the entry of biometric information, such as information related to fingerprint, face pattern and profile, voice print, palm print, and iris pattern. When the transaction requires more efficiency, the transaction server does not select text input interface or magnetic reader interface.

The payment input instruction may also include instructions related to what kind of input information is required by the transaction server. For example, the payment input instruction may notify the client terminal that at least credit card number and fingerprint information are required for this particular transaction and/or by this particular transaction server. The payment input instruction may list the interfaces that are required to input such information. The specific combination of the required informational items may vary based on the payment amount, security and efficiency requirements, and the hardware and software profiles of the transaction server and/or the client terminal.

The payment input instruction may also include instructions related to how a payment input interface should be constructed. The payment information interface, which may include a number of user interfaces, allows the user to choose from a list of information input options and enter the information. The payment input instruction may specify not only what input interfaces should be included in the payment information interface, but also how the payment information interface should be presented.

As shown by step S403 and FIG. 4 and step S504 of FIG. 5, the client terminal generates a payment information interface to be displayed at the client terminal based on the payment input instructions. In some embodiments, the payment information interface presents the one or more acceptable input interfaces for user selection.

Figure 2:
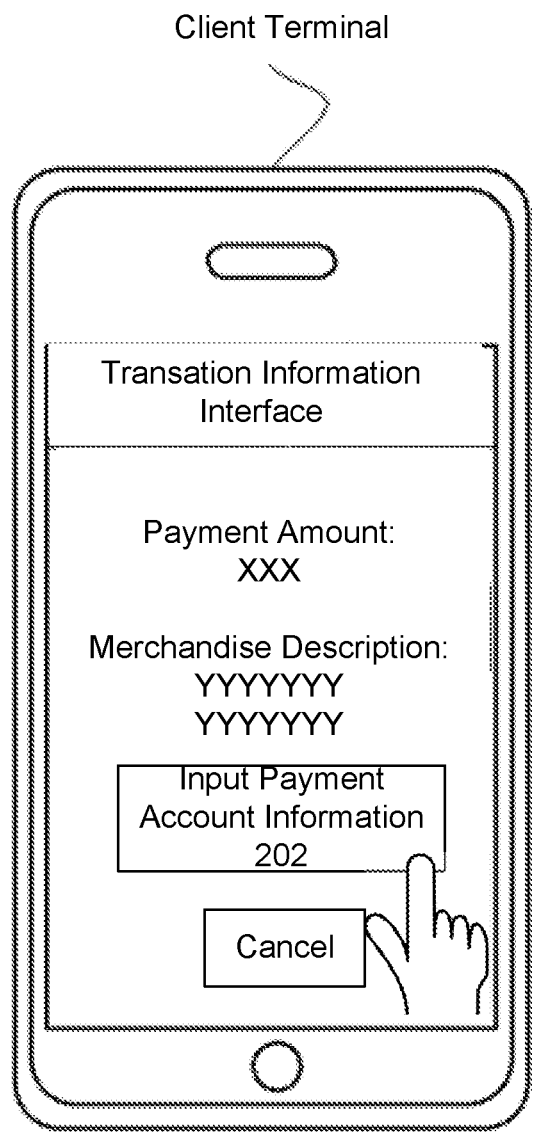
FIG. 2 is an exemplary screen shot of the client terminal according to some embodiments.

Referring to FIG. 2, which is an exemplary screen shot of the client terminal according to some embodiments of the present disclosure, wherein the client terminal presents a transaction information interface for the user to choose to enter payment account information. The transaction information interface may include a number of user interfaces, wherein FIG. 2 presents one example.

In FIG. 2, the client terminal is requesting the user to start the payment account information input process by making a selection of the affordance 202. It should be noted that the informational items presented in FIG. 2 are optional and they may vary based on specific requirements of the client terminal, the transaction server, and the transaction involved. In some embodiments, as shown in FIG. 2, the client terminal presents basic information related to the transaction, wherein the basic information may include a payment amount and a brief description of the merchandise or service to be purchased. It should also be noted that the current method not only applies to transactions involving payments out of the user's account (payer activity), but also transactions that involve payments into the user's account (payee activity). Payments involving payer activity (versus payee activities) are used as examples in the present disclosure.

The display of a user interface (e.g. as shown in FIG. 2) that allows the initiation of the payment account information input process may take place before or after the step described above. In some embodiments, the display of such a user interface may happen before step S101 of FIG. 1 and step S401 of FIG. 4. With such an approach, the client terminal sends the interface listing command only after the user chooses to input payment account information. In some embodiments, the display of the user interface shown in FIG. 2 is conducted after the client terminal sends the interface listing command to the transaction server or even after the transaction server sends back the payment input instructions and/or the client terminal generates the payment information interface based on the payment input instruction. In some embodiments, the interface displayed by FIG. 2 can be considered part of the payment information interface, wherein generally the user interface presented in FIG. 2 does not require the payment input instruction. It should be noted that the payment input instruction may be used for all or only part of the payment information interface.

FIGS. 3A and 3B are exemplary screen shots of the client terminal according to some embodiments of the present disclosure, wherein FIG. 3A shows an example of a payment information interface and 3B shows an example of an input interface.

As shown by FIG. 3A, the payment information interface may include a list of input options, such as but not limited to: scan cards, scan fingerprint, enter voice signal, scan code, and manual input account numbers. The payment information interface may also allow the user to choose more options or cancel the payment information input process and/or the transaction as a whole using one or more visual affordances. In presenting the payment information interface with the payment input options, the client terminal uses the payment input instruction from the transaction server, wherein the payment input instruction includes a listing of one or more acceptable input interfaces that can be employed to request and receive information from the user.

The options listed in FIG. 3A are examples that the client terminal may present to the user. The user may choose an option, which corresponds to an input interface, to enter the payment account information. As indicated above, some options allow the user to enter information that can be used to identify the payment account information of the user. The option of manual input account number allows the user to enter the payment account information by typing in the text and digits, wherein this option corresponds to the text input interface. The option of scanning cards allows the user to present one or more cards, e.g. a credit card, so that the client terminal can scan the card, wherein this option corresponds to the image capturing interface. The client terminal may generate an image based on the scanning and extract payment account information from the image; or the client terminal may send the image to the transaction server so that the transaction server extracts payment account information from the image. The option of scanning fingerprint allows the user to present his/her fingerprint that can be scanned by the client terminal, wherein this option corresponds to the fingerprint input interface, and the fingerprint information can be used to identify the payment account information by the client terminal or the transaction server. Similarly, other biometric information such as voice signals can be collected by the client terminal and such information can be used to identify the payment account information. For example, when the user chooses to enter a voice signal, the client terminal may present the speech input interface, wherein the speech input interface requests the user to speak to a voice collecting portal, e.g. a microphone. The client terminal may collect the voice signal, extract voice print information from the signal, and send the voice print information to the transaction server to identify the payment account information. Alternatively, the client terminal may collect the voice signal and send the signal as audio files to the transaction server so that the transaction server extracts the voice print information and identify the payment account information.

In some embodiments, the payment account information or related information may be encrypted into a code; in some embodiments the payment account information may be accompanied by a code that can be used as identification information by itself or a code that encrypts information (e.g. user identity information or identification information) related to the payment account. The code can be any kind of text or image that may be used to encrypt information. Examples of the code may include but are not limited to: bar codes, two-dimensional codes, which may include two-dimensional stacked codes, two-dimensional row-column codes, two-dimensional matrix codes, and three-dimensional codes.

As shown by step S404 of FIG. 4 and steps S505 of FIG. 5, the client terminal receives a selection input for a respective one of the one or more acceptable input interfaces for receiving the payment account information through the payment information interface. For example, the user may choose a specific input interface by selecting an option displayed in FIG. 3A.

When the user chooses the scan code option in the payment information interface shown in FIG. 3A, the client terminal may display a code scanner interface and allows the user to scan information carrier such as payment card (e.g. a credit card) bearing an encrypted code. In some embodiments, the code encrypts payment account information such as the card number, the bank name, and the user's name. For example, as shown in FIG. 3C, a card may bear a both a card number and an encrypted code. The user can present the card close to a camera of the client terminal, so that the client terminal may scan the identification code on the surface of the payment card. The code scanner interface may be automatically linked to a decrypting program so that the client terminal decrypts the code after scanning and acquires the payment account information. It should be noted that the card shown in FIG. 3A is an example that may be varied. For instance, the card may bear an encrypted code without showing the card number, wherein the code encrypts the payment account information, which may include the card number. Such an approach limits the accessibility of the card but improves security.

As shown in FIG. 3A, the client terminal may allow the user to choose other input options to enter the payment account information or the information that can be used to identify the payment account information. For example, the client terminal may use interfaces such as but not limited to an electronic card reader interface, a magnetic card reader interface, and an electronic storage retrieval interface so that the user can select an option as to how to enter the information. As indicated, the available interfaces may be limited by the hardware and software profiles of the transaction server and/or the client terminal. For example, the magnetic card reader interface may rely on a magnetic card reader that is part of or associated with the client terminal; the electronic card reader interface may rely on an electronic card reader that is part of or associated with the client terminal; and the electronic storage retrieval interface may rely on an electronic storage retrieval accessory that is part of or associated with the client terminal.

FIG. 3B shows the fingerprint input interface as an example of input interfaces. As shown by FIG. 3B, the client terminal displays an input interface after the user selects the option to scan fingerprint in the list shown in FIG. 3A, wherein the input interface requests the user to scan his/her fingerprint by pressing the right thumb to a scanning field. It should also be noted that the specific design of the fingerprint input interface may vary based on the client terminal's default setup, the user's choices, and the program incorporating the input interfaces. For other choices shown in FIG. 3A, corresponding interfaces can be employed to allow the user to enter the requested information.

In some embodiments, as shown in FIGS. 3A and 3B, the payment information interface and input interface show information related to the transaction, such as the payment amount and a brief description (e.g. the name) of the merchandise or service to be purchased.

As shown by step S405 of FIG. 4 and step S506 of FIG. 5, the client terminal may activate the respective one of the one or more acceptable input interfaces for receiving the payment account information in accordance with the selection input in response to the selection input from the user. Activating the selected input interface may involve access to hardware or accessories such as but not limited to: camera, microphone, and card readers. In addition, specific portals and application programming interfaces (API) may also be employed.

As shown by step S405 of FIG. 4 and step S507 of FIG. 5, the client terminal may receive payment account information from the user through the respective one of the one or more acceptable input interfaces for receiving information. As indicated, alternatively the client terminal may receive information from the user through the respective one of the one or more acceptable input interfaces and that such information can be used to identify the payment account information. For example, fingerprint information received from the input interface can be used to identify the payment account number or other identifiers of the payment account. In such cases, the payment account information has been stored in the client terminal or transaction server and a corresponding relationship has been established between the payment account information and the information that is received. In some embodiments, a direct corresponding relationship has been established between the payment account and information such as fingerprint pattern and/or voice print, wherein such information can be used directly to identify the payment account. In this sense, the fingerprint information, the voice print information or other types of information can be considered payment account information.

Information related to the identity of the user may also be retrieved through the payment information interface and the input interfaces. Such user identity information may include the user's name, date of birth (DOB), personal identification number (e.g. number on an identification document such as a passport or driver license), biometric information such as information related to fingerprint, voiceprint, face pattern, and iris of the user. The user identity information and the payment account information may be overlapping in some embodiments. For example, the fingerprint information can be used as not only the identity information of the user, but also to identify the payment account.

In some embodiments, the payment information interface requests the user to enter only one type of information. In some embodiments, the information can be used directly as payment account information or can be used to identify the payment account information; in some embodiment, the information can be used as identity information; in some embodiments, the information can be used as both payment account information and user identity information.

In some embodiments the payment information interface requests the user to enter more than one type of information, which may include the payment account information and the user identity information. For example, the payment information interface may present a number of choices to the user and request the user to enter (1) payment account number, and (2) identity information. The user may choose to enter the payment account number through manual input, scanning card, using card reader, or scanning code encrypting the payment account number; the user may choose to enter the user identity information by inputting finger print information, inputting voice signal, manually entering identification number, scanning identification card, or scanning a code encrypting the user identity information. The requests to enter the payment account information and the user identity information can be presented by the payment information interface in a sequential manner or simultaneously.

As shown by step S407 of FIG. 4, also referring to step S104 of FIG. 1 and step S508 of FIG. 5, the client terminal sends a payment request to the transaction server. The payment request notifies the server that payment account information has been retrieved and further processing of a payment transaction is needed. In some embodiments, the payment request comprises the received payment account information. In some embodiments, the payment account information comprises the received payment account information and payment information such as the payment amount and information related to the merchandise or service purchased. In some embodiments, the payment request comprises a payment amount, user identity information and the received payment account information. The user identity information may be received together with the payment account information through the payment information interface and the input interface; or the user identity information has been collected by the client terminal through other channels.

Figure 6:
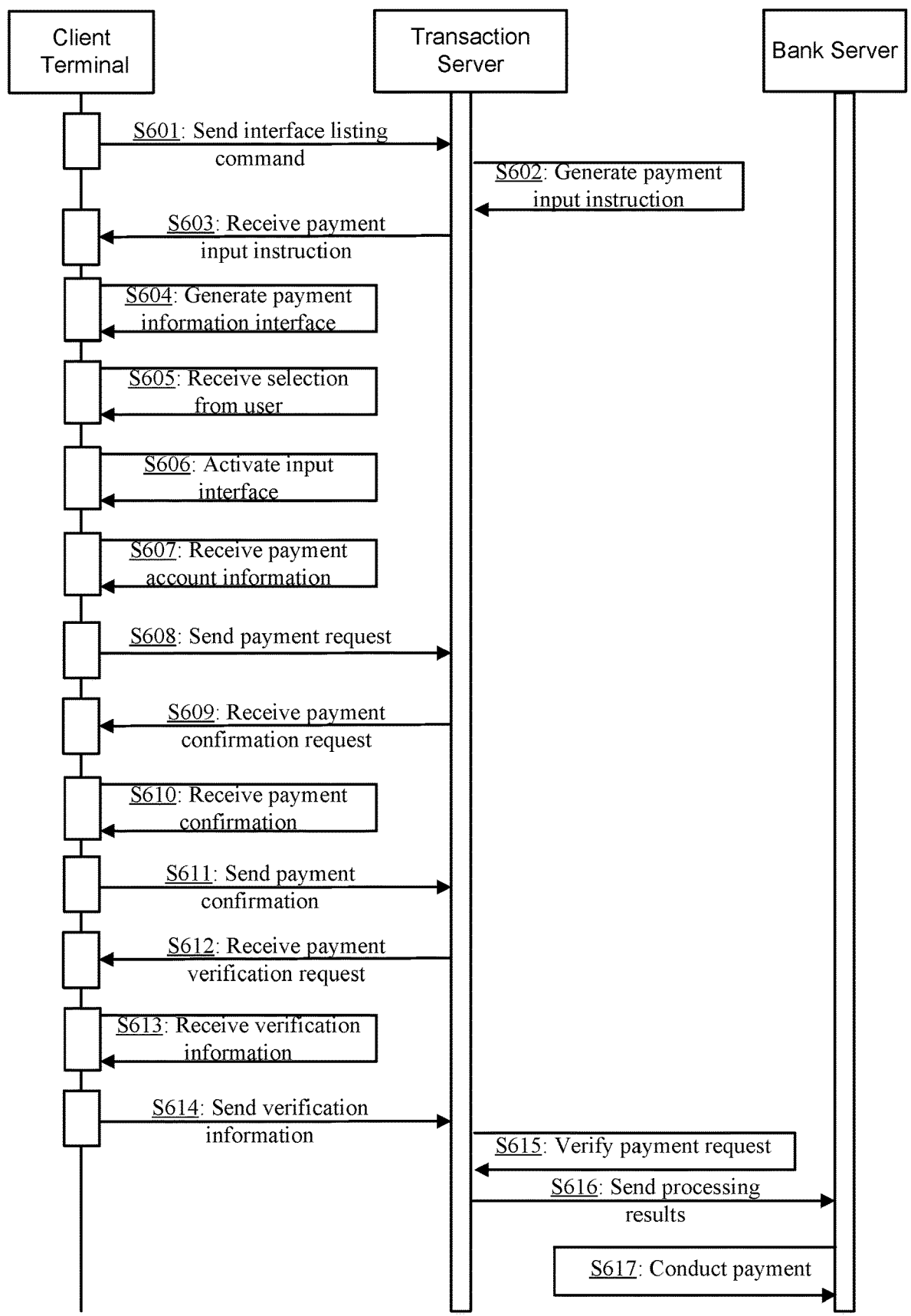
FIG. 6 is schematic illustration of an online payment method, showing how a client terminal, a transaction server, and a bank server interact according to some embodiments.
Figure 8:
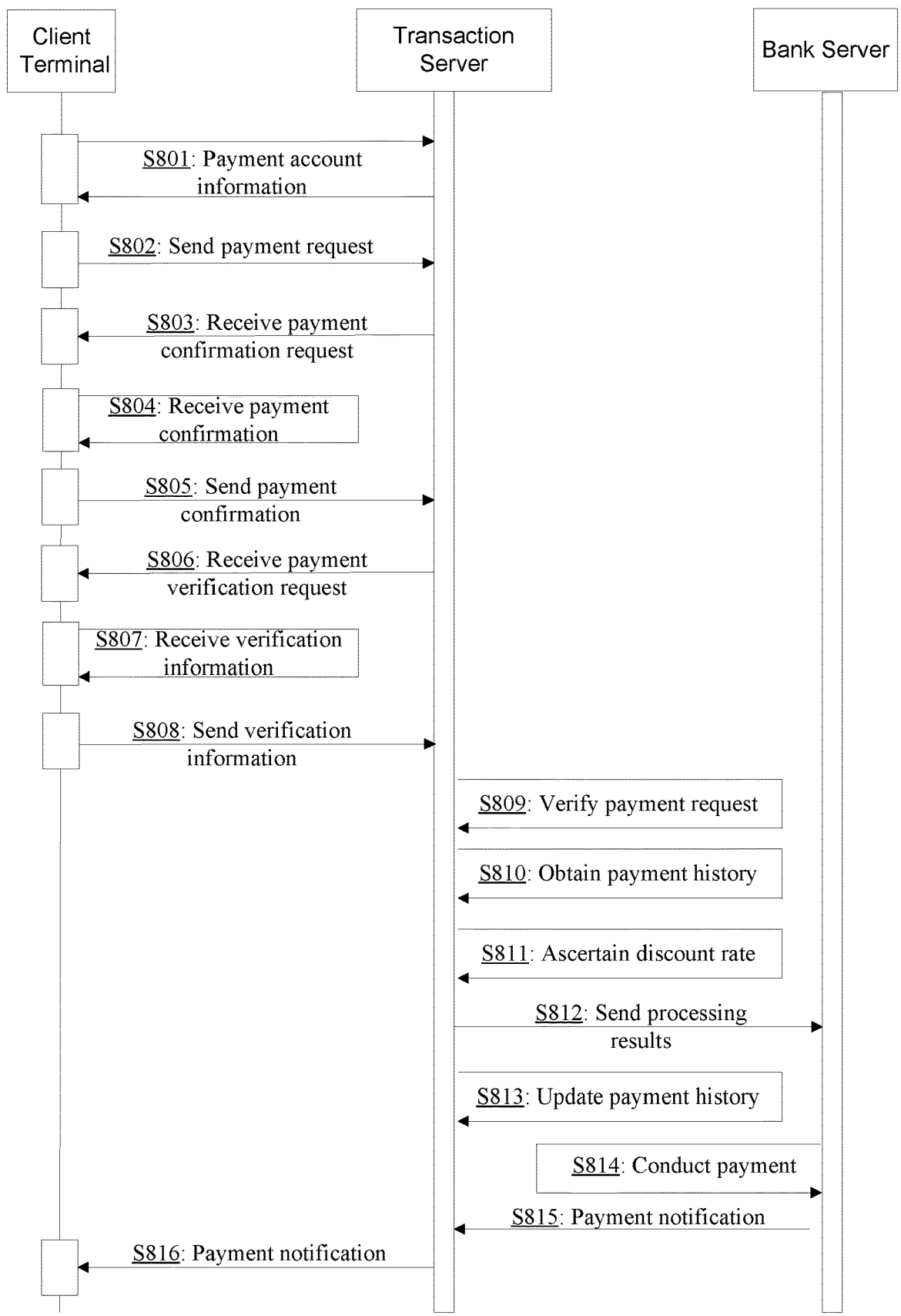
FIG. 8 is schematic illustration of an online payment method, showing how a client terminal, a transaction server, and a bank server interact according to some embodiments.

As shown by steps S104 and S105 of FIG. 1, after receiving the payment request from the client terminal, the transaction server processes the payment request. In some embodiments, the processing of the payment request involves additional exchanges between the transaction server and the client terminal, and/or between the client terminal and the user, as shown by FIG. 5, FIG. 6 and FIG. 8. In some embodiments, the processing of the payment request does not involve additional exchanges between the transaction server and client terminal.

One aspect in the processing of the payment request involves verification of the payment request, where the transaction server verifies that the user is authorized to access the payment account. The verification can be conducted by determining whether the received user identity information is associated with the payment account. In particular, when the received user identity information is sent to the transaction server with the payment account information, the transaction server may compare the received user identity information in the payment request to saved information. For example, the client terminal can extract the payment account information, search for saved user identity information using the payment account information, and compare the saved user identity information with the user identity information received from the user for the transaction. Matching the saved user identity information and the received user identity information may indicate that the verification is successful. A failure in the search or a failure to match the saved and received user identity information may indicate that the verification is unsuccessful.

As shown by step S509 of FIG. 5, the transaction server may process the payment request, wherein the processing may involve verification of the payment request. In particular, the verification of the payment request may involve authentication of the user identity information. During the verification process, the client terminal and transaction server may interact and exchange information.

As shown by steps S510 and S511 of FIG. 5, after processing the payment request, the transaction server may send the processing results to a bank server so that the bank server can conduct the payment when the processing results includes an approval that the payment can be conducted. The bank server refers to servers that store or manage accounts that can be used for payment transfers. The bank server may be managed by entities such a bank or a transaction platform. When the verification is not successful, the processing results include a denial of the payment request and the transaction server may or may not send the processing results to the bank server.

FIG. 6 is schematic illustration of an online payment method, showing how a client terminal, a transaction server, and a bank server interact according to some embodiments of the present disclosure.

Steps S601-S608 of FIG. 6 are similar to the steps of S501-S508 of FIG. 5. In particular, as shown by step 601 of FIG. 6, the client terminal sends an interface listing command to the transaction server; as shown by step 602 of FIG. 6, the transaction server generates a payment input instruction based on the interface listing command, wherein the payment input instruction includes a listing of the one or more acceptable input interfaces for receiving the payment account information from the user; as shown by step 603 of FIG. 6, the client terminal receives the payment input instruction from the transaction server; as shown by step 604 of FIG. 6, the client terminal generates a payment information interface based on the payment input instruction, wherein the payment information interface presents the one or more acceptable input interfaces for user selection; as shown by step 605 of FIG. 6, the client terminal receives a selection input for a respective one of the one or more acceptable input interfaces for receiving the payment account information through the input interface; as shown by step 606 of FIG. 6, the client terminal activate the respective one of the one or more acceptable input interfaces for receiving the payment account information in accordance with the selection input in response to the selection input of the user; as shown by step 607 of FIG. 6, the client terminal receives payment account information with or without the user identity information from the user; as shown by step 608 of FIG. 6, the client terminal sends a payment request to the transaction server.

As shown by step S609 of FIG. 6, the client terminal receives a payment confirmation request from the transaction server. To ensure that the user is fully informed regarding the payment transaction, the transaction server may request the user to enter additional confirmation through the client terminal to confirm that the user intends to proceed with the payment process. In some embodiments, the payment confirmation request includes a request for confirmation but does not include the received payment account information because such information has been saved by client terminal when the user inputs the information through the client terminal. In some embodiments, the payment confirmation request includes the payment account information or part of the payment account information because the client terminal does not acquire or does not save the payment account information. For example, in some embodiments the client terminal acquires an encrypted code by scanning a card and sends the code to the transaction server; the transaction server then decrypts the code and obtains the payment account information; the payment account information or part of the payment account information thus needs to be sent back to the client terminal as part of the payment confirmation request to allow the user to confirm or cancel the payment transaction.

Figure 7A:
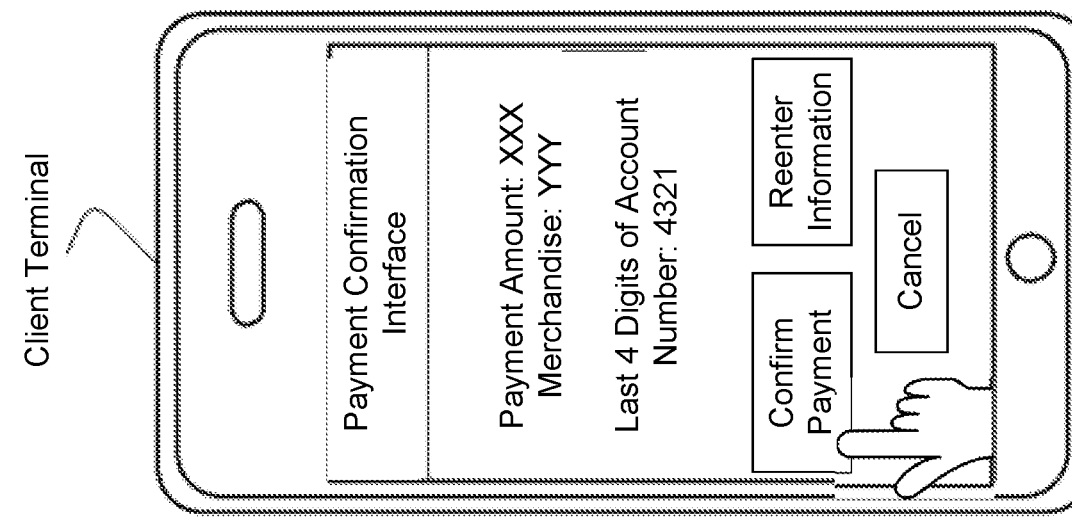
FIGS. 7A, 7B and 7C are exemplary screen shots of the client terminal during the payment confirmation and verification processes according to some embodiments.

FIG. 7A is an exemplary screen shot of the client terminal during the payment confirmation process according to some embodiments of the present disclosure. In particular, as shown in FIG. 7A, after receiving the payment confirmation request from the transaction server, the client terminal displays a payment confirmation interface and requests the user to confirm that information related to the payment transaction is accurate and that the user intends to continue with the payment. The client terminal may display information such as but not limited to: the payment amount, a brief description of the merchandise, and information related to the payment account that allows the user to confirm or deny that the payment account information has been entered properly. In FIG. 7A, the information related to the payment account is the last 4 digits of the payment account. It should be noted that the informational items shown in FIG. 7A can vary based on the specific requirements for security, convenience and efficiency. For example, the client terminal can display the entire payment account number so that the user has a better understanding of the information that has been added. The payment confirmation interface may also display information related to the user's identity, such as but not limited to the user's name, DOB, and address. As shown in FIG. 7A, the payment confirmation interface requests the user to select to confirm payment, re-enter information, or cancel the transaction. More or less options can be incorporated and displayed by the payment confirmation interface.

As shown by step S610 of FIG. 6, the client terminal receives a payment confirmation from the user. In some embodiments, when the user finds that the payment account information is correct, the user confirms the payment by making such a selection on the payment confirmation interface. In some embodiments, when the user finds errors with the payment account information, the user may choose to re-enter the information and later confirm the corrected information.

As shown by step S611 of FIG. 6, the client terminal sends the payment confirmation to the transaction server so that the transaction server proceeds with the payment process.

As shown by step S612 of FIG. 6, the client terminal receives a payment verification request from the transaction server. As indicated, in some embodiments the transaction server processes the payment request without acquiring additional information through the client terminal. When verification information, e.g. user identity information or a pass code, is sent to the transaction server with the payment account information, it is possible that the transaction server does not contact the client terminal for verification. In some embodiments, the verification information is not sent to the transaction server with the payment account information; in such cases the transaction server may send a payment verification request to the client terminal so the client terminal may request the user to enter verification information.

The payment verification request may specify the types of information that can be used as verification information. The specific types of information that are requested may be determined by the specific transaction, by the hardware and software profiles of the transaction server and/or the client terminal, and/or by the user's choice when the user entered the payment account information. Similar to the payment input instruction, the payment verification request may specify which input interface should be used for the entry of the verification information. In some embodiments, when the user entered payment account information such as payment account number, the payment verification request may instruct the client terminal to present a payment verification interface that only allows the user to enter user identity information, such as but not limited to biometric information. In some embodiments, the payment verification request may demand that the client terminal presents a payment verification interface that incorporate input interfaces that have not been used by the user in entering the payment account information. For example, when the user chose to enter the payment account information by scanning his/her fingerprint, the payment verification request may instruct the client terminal to present a payment verification interface that does not include the fingerprint scanner interface. In some embodiments, the payment verification requests allows the user to enter the verification information with the same input interface that was used to enter the payment account information. For example, the user has chosen to manually enter the payment account number with the text input interface; the user may use the same interface to enter a pass code as the verification information for the payment request.

Figure 7B:
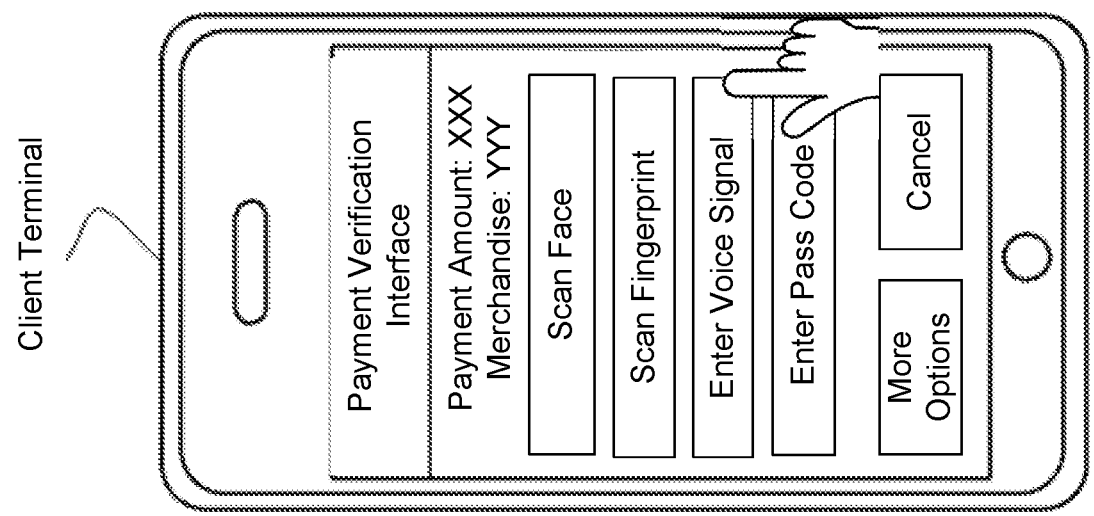
Figure 7C:
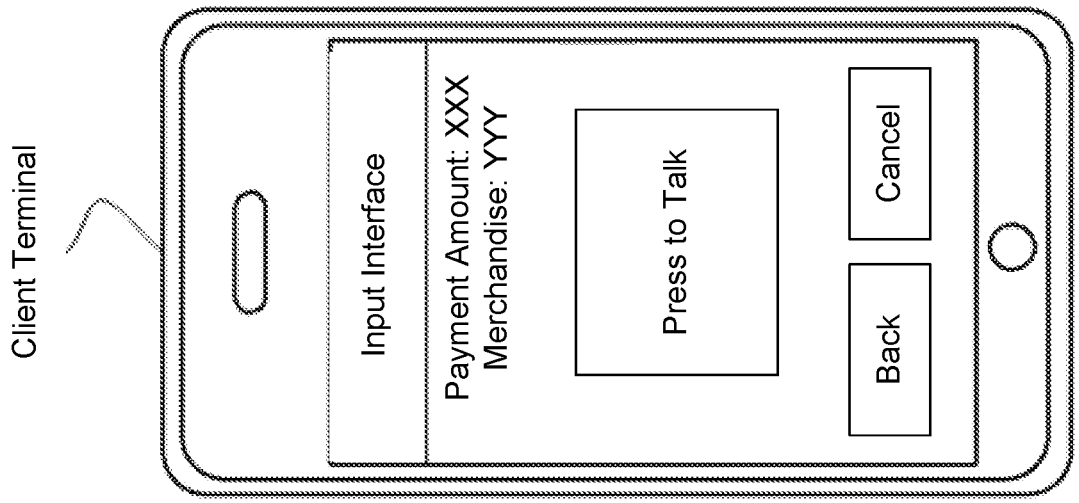

FIGS. 7B and 7C are exemplary screen shots of the client terminal during the payment verification process according to some embodiments of the present disclosure.

As shown in FIG. 7B, after receiving the payment verification request from the transaction server, the client terminal presents a payment verification interface, which may include one or more user interfaces. In FIG. 7B, the payment verification interface requests the user to choose to scan face pattern, scan fingerprint, enter voice signal, or enter pass code. In addition, the payment verification interface allows the user to choose from more options or cancel the transaction. As indicated, in some embodiments, the client terminal does not allow the user to enter the same information for verification and for payment account information. For example, when the user chose to scan fingerprint as shown in FIG. 3B, the payment verification interface as shown in FIG. 7B may lack such a choice or such a choice may be un-selectable.

As shown by step S613 of FIG. 6, the client terminal may receive payment verification information from the user through the payment verification interface. For example, when the user choose to enter voice signal in the payment verification interface shown in FIG. 7B, an input interface as shown in FIG. 7C may be displayed. The user is asked to enter voice signal by pressing a button and talk to the microphone. FIG. 7C serves as an example for the input interfaces that may be used to enter the verification information.

As shown by step S614 of FIG. 6, after receiving the verification information from the user, the client terminal sends the verification information to the transaction server.

As shown by step S615 of FIG. 6, the transaction server verifies the payment request based on the verification information from the client terminal. In particular, the transaction server may compare the user identity information in the payment request to saved information. For example, the client terminal can search for saved verification information, e.g. user identity information, using the payment account information and compare the saved verification information with the verification information received from the user through the payment verification interface. Matching the saved user verification information and the received verification information may indicate that the verification is successful. A failure in the search or a failure to match the saved and received verification information may indicate that the verification is unsuccessful. When the verification is successful, the processing results may include an approval. When the verification is unsuccessful, the processing results may include a denial. It should also be noted that in some embodiments the processing results do not entirely depend on the verification of the payment request. For example, when the transaction server determines that there is insufficient funds in the payment account to complete the transaction, even when the user is authorized to access the funds, the transaction server may deny the payment transaction.

As shown by step S616 of FIG. 6, the transaction server sends the processing results to a bank server. In some embodiments, the transaction server also sends the processing results to the client terminal to inform the user.

As shown by step 617 of FIG. 6, the bank server conducts the payment when the processing results include an approval.

FIG. 8 is schematic illustration of an online payment method, showing how a client terminal, a transaction server, and a bank server interact according to some embodiments of the present disclosure.

As shown by step S801 of FIG. 8, also referring to steps S501-S507 of FIG. 5, the client terminal and the transaction server may interact so that a user may enter the payment account information through the payment information interface and the input interfaces and that transaction server can obtain the payment account information from the client terminal.

As shown by steps S802-S809 of FIG. 8, also referring to step S608-S615 of FIG. 6, the client terminal may send a payment request to the transaction server; the transaction server sends a payment confirmation request to the client terminal; the client terminal displays a payment confirmation interface so that the client terminal can receive a confirmation from the user regarding the payment transaction; the client terminal sends the confirmation to the transaction server; the client terminal receive a payment verification request from the transaction server; the client terminal displays a payment verification interface and an input interface so that the user can enter verification information; the client terminal sends the payment verification information to the transaction server; and the transaction server verifies the payment request based on the payment verification information.

As shown by step S810 of FIG. 8, in some embodiments the transaction server obtains the payment history of the payment account. In some embodiments, the transaction server obtains the payment history from the bank server. The transaction server may make certain adjustments to the processing results of the payment request based on the payment history. Steps S811-S813 describe an example as to how the adjustments may be carried out.

As shown by step S811 of FIG. 8, the transaction server ascertains a discount rate for the payment transaction based on the payment history. In particular, if the user identity information and payment account information are verified by the transaction server, the transaction server calculates a discount rate for the user based on the payment amount and historical data associated with the payment account. The discount rate for the payment transaction may be determined by one or more factors such as but not limited to: a historic discount rate deduced from the payment history, the payment amount of the current payment transaction, and adjustment parameters, wherein the adjustment parameters may be determined by pre-existing agreements between the user and the other party involved in the transaction.

As shown by step S812 of FIG. 8, the transaction server sends the processing results of the payment request to the bank server, wherein the processing results comprise the discount rate and an approval or denial. As indicated, when the processing results include a denial, in some embodiment it is not necessary to perform steps S812-S815. In such cases, the transaction server may inform the user through the client terminal, indicating that the transaction cannot be completed. In some embodiments, the transaction server provides reasons as to the failure to complete the transaction, such as but not limited to unsuccessful verification and insufficient funds.

As shown by step S813 of FIG. 8, the transaction server updates payment history of the payment account, taking into consideration the current payment transaction. It should be noted that, in some embodiments, steps S810, S811 and S813 may be conducted by the bank server. In such cases, the transaction server sends the processing results, which do not include the discount rate to the bank server before the bank server obtains the payment history of the payment account, ascertains the discount rate, and updates the payment history.

As shown by step S814 of FIG. 8, the bank server conducts the payment based on the processing results. In some embodiments, the bank server conducts the payment when the processing results include an approval. In some embodiments, the bank server conducts the payment according to the discount rate included in the processing results.

As shown by step S815 of FIG. 8, the bank server sends a payment notification to the transaction server, indicating the payment transaction has been conducted. Alternatively, the bank server sends the payment notification directly to the client terminal.

As shown by step S816 of FIG. 8, the transaction server sends the payment notification to the client terminal.

FIGS. 9-13 illustrate the devices and systems that may be used to perform the methods described above. To avoid redundancy, not all the details and variations described for the method are herein included for the devices and systems. Such details and variations should be considered included for the description of the devices and as long as they are not in direct contradiction to the specific description provided for the devices and systems.

Figure 9:
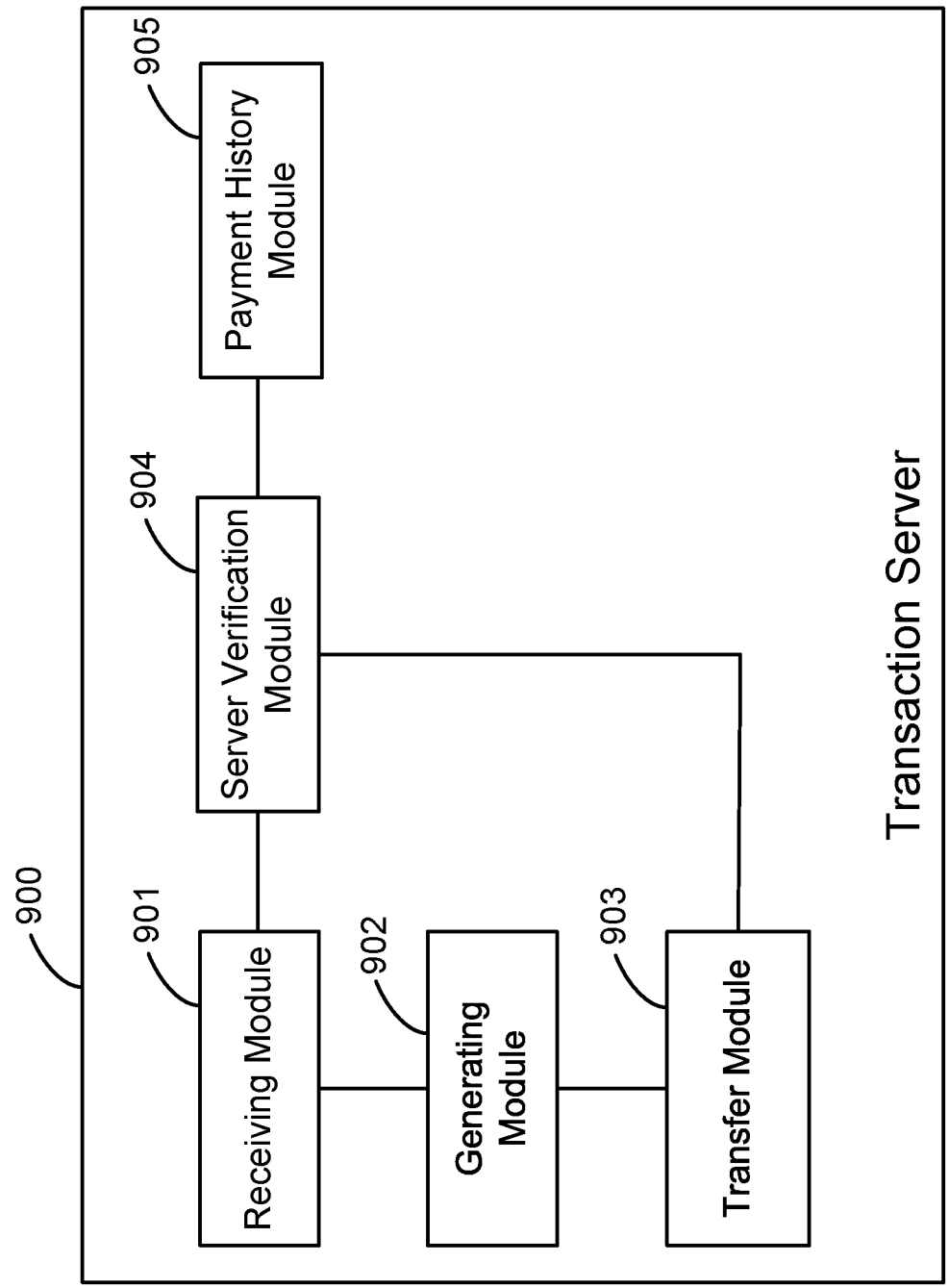
FIG. 9 is a block diagram of an online payment device, such as a transaction server, according to some embodiments.

FIG. 9 is a block diagram of an online payment device, such as a transaction server 900, according to some embodiments of the present disclosure. As shown in FIG. 9, the transaction server 1 comprises a receiving module 901, a generating module 902, a transfer module 903, a server verification module 904, and a payment history module 905.

In some embodiments, the receiving module 901 is configured to receive an interface listing command from a client terminal, wherein the interface listing command requests the transaction server to identify one or more acceptable input interfaces for receiving the payment account information from the user.

In some embodiments, the generating module 902 is configured to generate a payment input instruction in response to the interface listing command.

In some embodiments, the transfer module 903 is configured to send a payment input instruction to the client terminal, wherein the payment input instructions include a listing of the one or more acceptable input interfaces for receiving the payment account information from the user.

In some embodiments, the server verification module 904 is configured to acquire payment verification information and verify the payment request. In some embodiments, the payment verification information and the payment account information are entered with different input interfaces.

In some embodiments, the payment history module 905 is configured to obtain the payment history of the payment account, ascertain the discount rate, and update the payment history. In particular, if the user identity information and payment account information are verified by the transaction server, the transaction server calculates a discount rate for the user based on the payment amount and historical data associated with the payment account.

Figure 10:
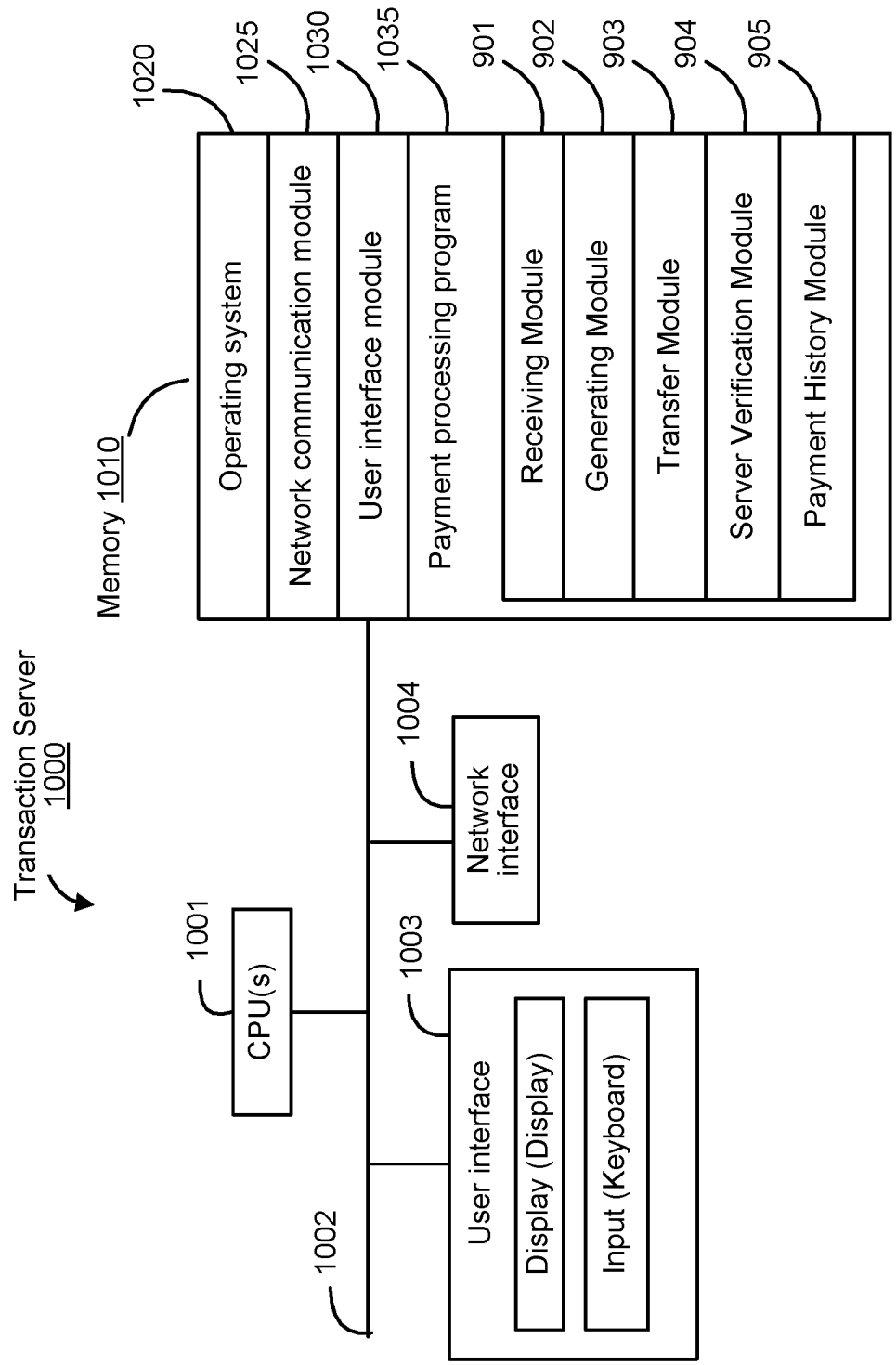
FIG. 10 is a schematic structural diagram of an online payment device, such as a transaction server, according to some embodiments.

FIG. 10 is a schematic structural diagram of an online payment device, such as a transaction server, according to some embodiments of the present disclosure.

As shown in FIG. 10, the exemplary transaction server 1000 typically includes one or more processing units (CPU's) 1001, one or more network or other communications interfaces 1004, memory 1010, and one or more communication buses 1002 for interconnecting these components. The communication buses 1002 may include circuitry (sometimes called a chipset) that interconnects and controls communications between system components. The user interface 1003 may include a touch screen, or a display and a keyboard. In some embodiments, the user interface 1003 may further include a standard wired interface and wireless interface, e.g. a Wi-Fi interface. Memory 1010 may include high speed random access memory and may also include non-volatile memory, such as one or more magnetic disk storage devices. Memory 1010 may include mass storage that is remotely located from the CPU's 1001. In some embodiments, memory 1010 stores the following programs, modules and data structures, or a subset or superset thereof:

- an operating system 1020 that includes procedures for handling various basic system services and for performing hardware dependent tasks;
- a network communication module 1025 that is used for connecting the transaction server 1000 to other devices such as the client terminal and the bank server via one or more communication networks (wired or wireless), such as the Internet, other wide area networks, local area networks, metropolitan area networks, and so on;
- a user interface module 1030 configured to receive user inputs through the user interface 1003;
- and one or more payment processing programs 1035 including a number of server-side application modules such as the following:
- a receiving module 901 configured to receive an interface listing command from a client terminal, wherein the interface listing command requests the transaction server to identify one or more acceptable input interfaces for receiving the payment account information from the user;
- a generating module 902 configured to generate a payment input instruction in response to the interface listing command;
- a transfer module 903 configured to send a payment input instruction to the client terminal, wherein the payment input instructions include a listing of the one or more acceptable input interfaces for receiving the payment account information from the user;

a server verification module 904 configured to acquire payment verification information and verify the payment request; and a payment history module 905 configured to obtain the payment history of the payment account, ascertain the discount rate, and update the payment history.

Figure 11:
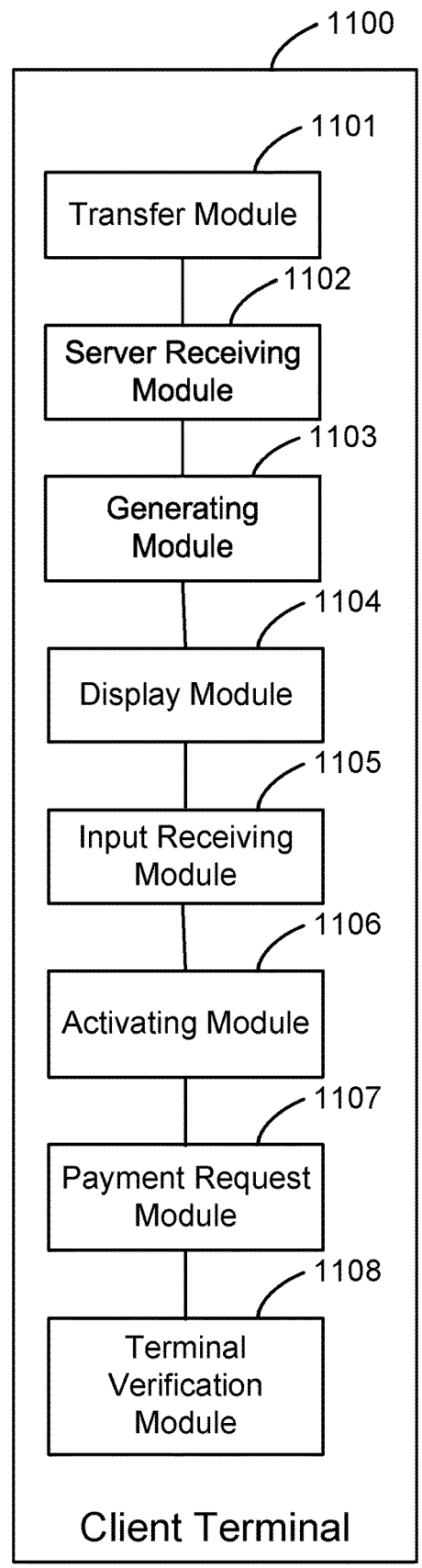
FIG. 11 is a block diagram of an online payment device, such as a client terminal, according to some embodiments.

FIG. 11 is a block diagram of an online payment device, such as a client terminal 1100, according to some embodiments of the present disclosure. The client terminal 1100 may comprise a transfer module 1101, a server instruction receiving module 1102, a generating module 1103, a display module 1104, a user receiving module 1105, an activating module 1106, a payment request module 1107, and a terminal verification module 1108.

The transfer module 1101 is configured to send an interface listing command to a transaction server prior to accepting payment account information from a user for a payment transaction. In some embodiments, the interface listing command requests the transaction server to identify one or more acceptable input interfaces for receiving the payment account information from the user. In addition, the transfer module 1101 is further configured to send a payment request to the transaction server, wherein the payment request comprises a payment amount, user identity information and the received payment account information The server instruction receiving module 1102 is configured to receive a payment input instruction from the transaction server in response to sending the interface listing command. In some embodiments, the payment input instruction includes a listing of the one or more acceptable input interfaces for receiving the payment account information from the user. In some embodiments, the one or more acceptable input interfaces are selected from a group consisting of: a text input interface, an image capturing interface, a code scanner interface, a speech input interface, a biometric input interface, an electronic card reader interface, a magnetic card reader interface, and an electronic storage retrieval interface.

The generating module 1103 is configured to generate a payment information interface for display at the client terminal based on the payment input instruction. In some embodiments, the payment information interface presents the one or more acceptable input interfaces for user selection.

The display module 1104 is configured to display interfaces such as the payment information interface and the payment verification interface.

The input receiving module 1105 is configured to receive input from a user. In some embodiments, the input receiving module 1105 is configured to receive, through the payment information interface, a selection input for a respective one of the one or more acceptable input interfaces for receiving the payment account information. In addition, the input receiving module 1105 is further configured to receive the payment account information from the user through the respective one of the one or more acceptable input interfaces for receiving the payment account information. Moreover, input receiving module 1105 is further configured to receive the user identity information with the payment account information, through the respective one of the one or more acceptable input interfaces.

The activating module 1106 is configured to activate the respective one of the one or more acceptable input interfaces for receiving the payment account information in accordance with the selection input in response to the selection input.

The payment request module 1107 is configured to generate and send a payment request to the transaction server.

The terminal verification module 1108 is configured to interact with the transaction server and the user to retrieve verification information from the user and send the verification information to the transaction server. In particular, the terminal verification module 1108 comprises a displaying unit configured to display a payment verification interface, wherein the payment verification interface identifies a plurality of alternative input interfaces for receiving payment verification information from the user for the payment transaction; a verification receiving unit configured to receive payment verification information through a respective one of the plurality of alternative input interfaces identified in the payment verification interface; and a verification transfer unit configured to send the payment verification information to the transaction server.

Figure 12:
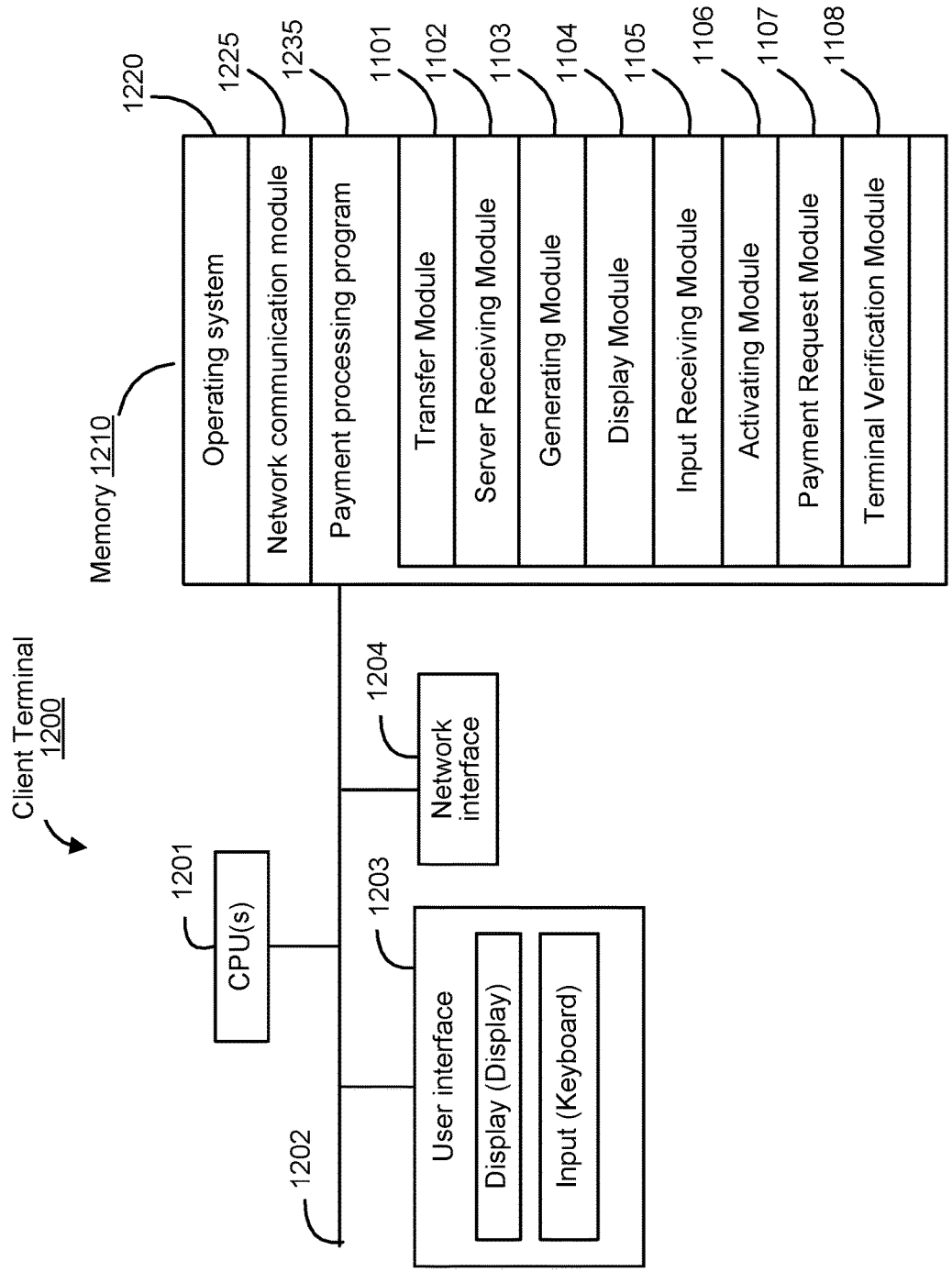
FIG. 12 is a schematic structural diagram of an online payment device, such as a client terminal, according to some embodiments.

FIG. 12 is a schematic structural diagram of an online payment device, such as a client terminal 1200, according to some embodiments of the present disclosure.

As shown in FIG. 12, the exemplary client terminal 1200 typically includes one or more processing units (CPU's) 1201, one or more network or other communications interfaces 1204, memory 1210, and one or more communication buses 1202 for interconnecting these components. The communication buses 1202 may include circuitry (sometimes called a chipset) that interconnects and controls communications between system components. The user interface 1203 may include a touch screen, or a display and a keyboard. In some embodiments, the user interface 1203 may further include a standard wired interface and wireless interface, e.g. a Wi-Fi interface. Memory 1210 may include high speed random access memory and may also include non-volatile memory, such as one or more magnetic disk storage devices. Memory 1210 may include mass storage that is remotely located from the CPU's 1201. In some embodiments, memory 1210 stores the following programs, modules and data structures, or a subset or superset thereof:

- an operating system 1220 that includes procedures for handling various basic system services and for performing hardware dependent tasks;
- a network communication module 1225 that is used for connecting the client terminal 1200 to other devices such as the transaction server and bank server via one or more communication networks (wired or wireless), such as the Internet, other wide area networks, local area networks, metropolitan area networks, and so on;
- and one or more payment processing programs 1235 including a number of terminal-side application modules such as the following:
- a transfer module 1101 configured to send an interface listing command to a transaction server prior to accepting payment account information from a user for a payment transaction;
- a server instruction receiving module 1102 configured to receive a payment input instruction from the transaction server in response to sending the interface listing command;
- a generating module 1103 configured to generate a payment information interface for display at the client terminal based on the payment input instruction;
- a display module 1104 configured to display interfaces such as the payment information interface and the payment verification interface;
- an input receiving module 1105 configured to receive input from a user;

an activating module 1106 configured to activate the respective one of the one or more acceptable input interfaces for receiving the payment account information in accordance with the selection input in response to the selection input;

a payment request module 1107 configured to generate and send a payment request to the transaction server; and a terminal verification module 1108 configured to interact with the transaction server and the user to retrieve verification information from the user and send the verification information to the transaction server.

Figure 13:
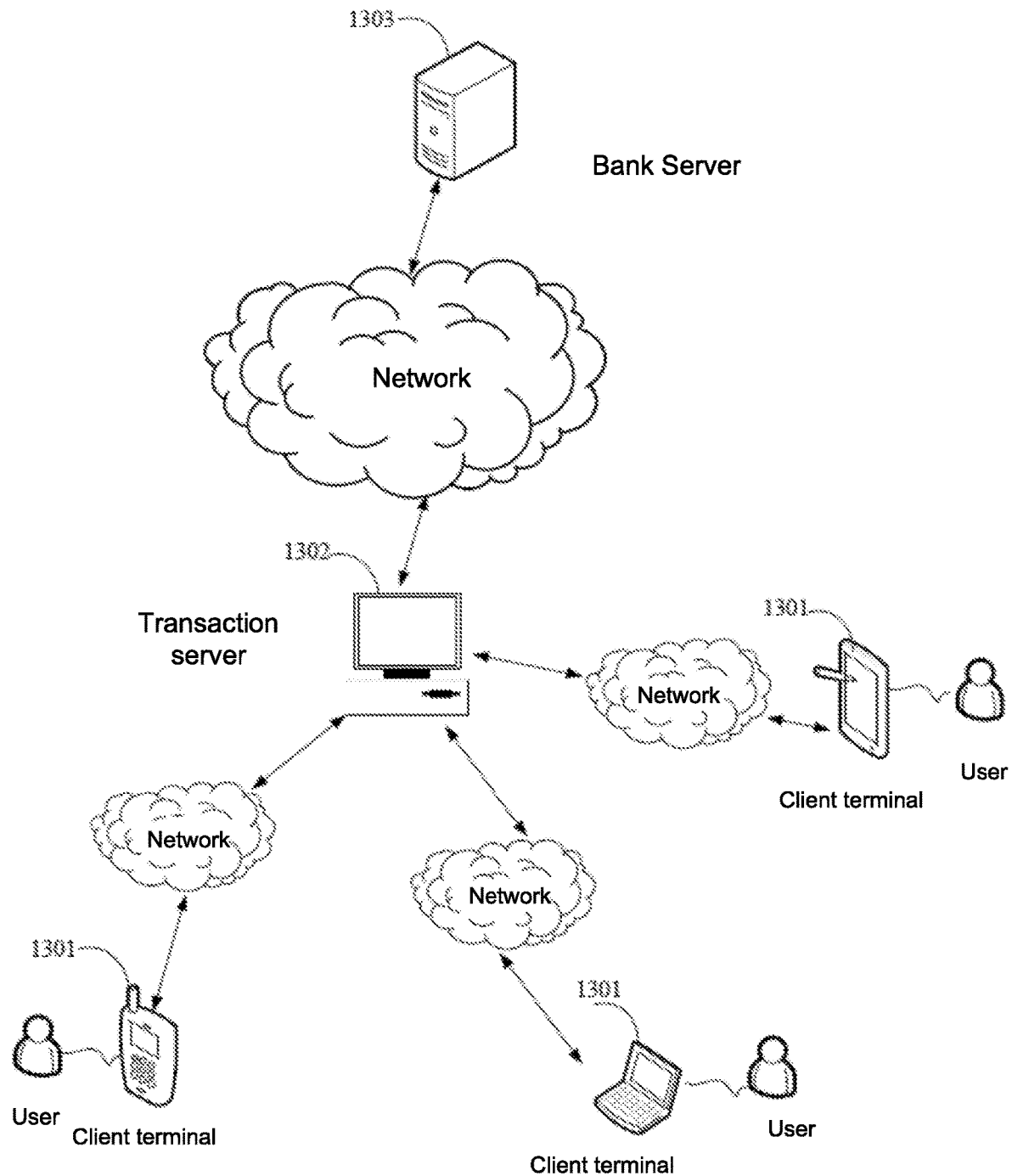
FIG. 13 is a schematic structural diagram of an online payment system according to some embodiments of the present disclosure.

FIG. 13 is a schematic structural diagram of an online payment system according to some embodiments of the present disclosure. As shown in FIG. 13, the online payment system comprises a transaction server 1302, a bank server 1303 and one or more client terminal 1303 with one or more users.

Each of the client terminals 1301 is configured to send an interface listing command to the transaction server 1302, wherein the interface listing command requests the transaction server to identify one or more acceptable input interfaces for receiving the payment account information from the user. The transaction server 1302 is configured to generate a payment input instruction in response to the interface listing command. The client terminal 1301 is configured to receive the payment input instruction from the transaction server 1302, wherein the payment input instruction includes a listing of the one or more acceptable input interfaces for receiving the payment account information from the user.

The client terminal 1301 is further configured to generate a payment information interface for display at the client terminal based on the payment input instruction, wherein payment information interface presents the one or more acceptable input interfaces for user selection. In addition, the client terminal 1301 is configured to receive, through the payment information interface, a selection input for a respective one of the one or more acceptable input interfaces for receiving the payment account information. In response to the selection input, the client terminal 1301 can activate the respective one of the one or more acceptable input interfaces for receiving the payment account information in accordance with the selection input. The client terminal 1301 is further configured to receive the payment account information from the user through the respective one of the one or more acceptable input interfaces for receiving information. The client terminal 1301 can send a payment request to the transaction server 1302, wherein the payment request comprises a payment amount, user identity information and the received payment account information.

The transaction server 1302 is configured to process the payment request in accordance with the method described above. During the processing, the transaction server 1302 may or may not communicate with the client terminal 1301 for additional information, such as verification information, e.g. user identity information.

When the verification is successful, the transaction server 1302 is configured to communicate with the bank server 1303 and send processing results to the bank server 1303. The bank server 1303 is configured to conduct the payment transaction based on the processing results.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of facilitating a payment transaction, comprising:

at a client terminal having one or more processors and memory storing programs executed by the one or more processors, receiving, from a user of the client terminal, transaction information including a payment amount and merchandise information for the payment transaction;

detecting current software and hardware capabilities of the client terminal;

generating a payment information interface for display at the client terminal, the payment information interface including a first set of user identity verification options for user selection in accordance with the transaction information and the current software and hardware capabilities of the client terminal;

receiving, from the user of the client terminal, first user identity information from the first set of user identity verification options for user selection in the payment information interface in accordance with the transaction information and the current software and hardware capabilities of the client terminal;

sending a payment request to a transaction server, the payment request including the transaction information and the user-selected first user identity information;

receiving a payment verification request from the transaction server;

in response to the payment verification request, generating a payment verification interface including a second set of user identity verification options for user selection, in which the user-selected first user identity information is disabled;

receiving, from the user of the client terminal, second user identity information from the second set of user identity verification options for user selection in the payment verification interface in accordance with the transaction information and the current software and hardware capabilities of the client terminal, the user-selected second user identity information distinct from the user-selected first user identity information;

sending a verify payment request to the transaction server, the verify payment request including the second user identity information, wherein the transaction server is configured to verify the payment transaction in accordance with the user-selected first user identity information and the user-selected second user identity information; and receiving a payment notification message from the transaction server.

2. The method of claim 1, wherein the user-selected first user identity information is removed from the second set of user identity verification options.

3. The method of claim 1, wherein the first set of user identity verification options includes: a text input interface, an image capturing interface, a code scanner interface, a speech input interface, a fingerprint input interface, an electronic card reader interface, a magnetic card reader interface, and an electronic storage retrieval interface.

4. The method of claim 1, wherein the transaction server calculates a discount rate for the user based on the payment amount and historical data associated with the payment account.

5. The method of claim 1, further comprising:
before receiving, from the user of the client terminal, the second user identity information:
receiving a payment confirmation request from the transaction server;
in response to the payment confirmation request, generating a payment confirmation interface including one or more affordances configured for the user to confirm the payment transaction;
receiving a user confirmation through the payment confirmation interface; and
sending the user confirmation to the transaction server.

6. A client terminal having:
one or more processors;
memory; and
a plurality of program instructions stored in the memory and configured for execution by the one or more processors, the plurality of program instructions including:
receiving, from a user of the client terminal, transaction information including a payment amount and merchandise information for the payment transaction;
detecting current software and hardware capabilities of the client terminal;
generating a payment information interface for display at the client terminal, the payment information interface including a first set of user identity verification options for user selection in accordance with the transaction information and the current software and hardware capabilities of the client terminal;
receiving, from the user of the client terminal, first user identity information from the first set of user identity verification options for user selection in the payment information interface in accordance with the transaction information and the current software and hardware capabilities of the client terminal;
sending a payment request to a transaction server, the payment request including the transaction information and the user-selected first user identity information;
receiving a payment verification request from the transaction server;
in response to the payment verification request, generating a payment verification interface including a second set of user identity verification options for user selection, in which the user-selected first user identity information is disabled;
receiving, from the user of the client terminal, second user identity information from the second set of user identity verification options for user selection in the payment verification interface in accordance with the transaction information and the current software and hardware capabilities of the client terminal, the user-selected second user identity information distinct from the user-selected first user identity information;
sending a verify payment request to the transaction server, the verify payment request including the second user identity information, wherein the transaction server is configured to verify the payment transaction in accordance with the user-selected first user identity information and the user-selected second user identity information; and
receiving a payment notification message from the transaction server.

7. The client terminal of claim 6, wherein the user-selected first user identity information is removed from the second set of user identity verification options.

8. The client terminal of claim 6, wherein the first set of user identity verification options includes: a text input interface, an image capturing interface, a code scanner interface, a speech input interface, a fingerprint input interface, an electronic card reader interface, a magnetic card reader interface, and an electronic storage retrieval interface.

9. The client terminal of claim 6, wherein the transaction server calculates a discount rate for the user based on the payment amount and historical data associated with the payment account.

10. The client terminal of claim 6, wherein the plurality of program instructions further comprise:
before receiving, from the user of the client terminal, the second user identity information:
receiving a payment confirmation request from the transaction server;
in response to the payment confirmation request, generating a payment confirmation interface including one or more affordances configured for the user to confirm the payment transaction;
receiving a user confirmation through the payment confirmation interface; and
sending the user confirmation to the transaction server.

11. A non-transitory computer readable storage medium having stored therein a plurality of program instructions that, when executed by a client terminal, cause the client terminal to perform a plurality of operations including:
receiving, from a user of the client terminal, transaction information including a payment amount and merchandise information for the payment transaction;
detecting current software and hardware capabilities of the client terminal;
generating a payment information interface for display at the client terminal, the payment information interface including a first set of user identity verification options for user selection in accordance with the transaction information and the current software and hardware capabilities of the client terminal;
receiving, from the user of the client terminal, first user identity information from the first set of user identity verification options for user selection in the payment information interface in accordance with the transaction information and the current software and hardware capabilities of the client terminal;
sending a payment request to a transaction server, the payment request including the transaction information and the user-selected first user identity information;
receiving a payment verification request from the transaction server;
in response to the payment verification request, generating a payment verification interface including a second set of user identity verification options for user selection, in which the user-selected first user identity information is disabled;

receiving, from the user of the client terminal, second user identity information from the second set of user identity verification options for user selection in the payment verification interface in accordance with the transaction information and the current software and hardware capabilities of the client terminal, the user-selected second user identity information distinct from the user-selected first user identity information;

sending a verify payment request to the transaction server, the verify payment request including the second user identity information, wherein the transaction server is configured to verify the payment transaction in accordance with the user-selected first user identity information and the user-selected second user identity information; and receiving a payment notification message from the transaction server.

12. The non-transitory computer readable storage medium of claim 11, wherein the user-selected first user identity information is removed from the second set of user identity verification options.

13. The non-transitory computer readable storage medium of claim 11, wherein the first set of user identity verification options includes: a text input interface, an image capturing interface, a code scanner interface, a speech input interface, a fingerprint input interface, an electronic card reader interface, a magnetic card reader interface, and an electronic storage retrieval interface.

14. The non-transitory computer readable storage medium of claim 11, wherein the plurality of program instructions further comprise:

before receiving, from the user of the client terminal, the second user identity information:

receiving a payment confirmation request from the transaction server;

in response to the payment confirmation request, generating a payment confirmation interface including one or more affordances configured for the user to confirm the payment transaction;

receiving a user confirmation through the payment confirmation interface; and sending the user confirmation to the transaction server.

* * * * *